US008650182B2

(12) United States Patent
Murthy

(10) Patent No.: US 8,650,182 B2
(45) Date of Patent: Feb. 11, 2014

(54) MECHANISM FOR EFFICIENTLY SEARCHING XML DOCUMENT COLLECTIONS

(75) Inventor: Ravi Murthy, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 401 days.

(21) Appl. No.: 12/391,818

(22) Filed: Feb. 24, 2009

(65) Prior Publication Data

US 2010/0228734 A1    Sep. 9, 2010

(51) Int. Cl.
*G06F 17/00* (2006.01)
*G06F 17/30* (2006.01)

(52) U.S. Cl.
CPC .... *G06F 17/30569* (2013.01); *G06F 17/30911* (2013.01)
USPC ........... 707/715; 707/696; 707/673; 707/711; 707/803

(58) Field of Classification Search
CPC ...................... G06F 17/30569; G06F 17/30911
USPC ........................... 707/696, 715, 673, 711, 803
See application file for complete search history.

(56) References Cited

U.S. PATENT DOCUMENTS

| 6,366,934 | B1* | 4/2002 | Cheng et al. ................. 715/210 |
| 6,421,656 | B1* | 7/2002 | Cheng et al. ........................ 1/1 |
| 6,519,597 | B1* | 2/2003 | Cheng et al. ........................ 1/1 |
| 6,973,460 | B1 | 12/2005 | Mitra |
| 6,996,576 | B2 | 2/2006 | Vos et al. |
| 7,103,590 | B1 | 9/2006 | Murthy et al. |
| 7,120,645 | B2 | 10/2006 | Manikutty et al. |
| 7,472,108 | B2 | 12/2008 | Lim et al. |
| 2002/0116371 | A1 | 8/2002 | Dodds et al. |
| 2003/0014397 | A1 | 1/2003 | Chau et al. |
| 2004/0064466 | A1 | 4/2004 | Manikutty et al. |
| 2004/0068527 | A1* | 4/2004 | Smith, III ..................... 707/204 |
| 2004/0083209 | A1 | 4/2004 | Shin |
| 2004/0143581 | A1 | 7/2004 | Bohannon et al. |
| 2004/0243555 | A1 | 12/2004 | Bolsius et al. |
| 2005/0102672 | A1 | 5/2005 | Brothers |
| 2005/0160110 | A1 | 7/2005 | Charlet et al. |
| 2005/0203933 | A1 | 9/2005 | Chaudhuri et al. |
| 2005/0240624 | A1 | 10/2005 | Ge et al. |
| 2006/0036637 | A1 | 2/2006 | Sayal et al. |

(Continued)

OTHER PUBLICATIONS

Kurtz et al., "Delta Compression Algorithms for Diverse Environments," 2006.*

(Continued)

*Primary Examiner* — Cheyne D Ly
(74) *Attorney, Agent, or Firm* — Hickman Palermo Truong Becker Bingham Wong LLP

(57) ABSTRACT

The techniques presented herein are directed towards providing a user-directed keyword-based search on a large collection of XML documents, and displaying a summary of results to the user. Prior to receiving search requests from a user, an offline analysis of a large collection of XML documents is performed to construct an inverted index of keywords. For each keyword, the index stores a set of location indicators that identify all the instances of the keyword found in the collection of documents. Once the index is constructed, keyword searching can be done efficiently by a keyword lookup in the index. Various display strategies enable the user to see the specific portion of a large XML document containing the keyword and/or path frequency information allowing the user to easily refine the search to specific paths within the collection of documents.

22 Claims, 6 Drawing Sheets

| Key | Document id | Order key | Pathid |
|---|---|---|---|
| Scott | d1 | 1.1.1 | 3 |
| Brown | d1 | 1.1.2 | 4 |
| Java | d1 | 1.2 | 5 |
| Java | d1 | 1.3 | 6 |
| Java | d2 | 1.4 | 6 |
| C | d1 | 1.4 | 6 |
| C | d2 | 1.2 | 5 |
| C | d2 | 1.3 | 6 |
| David | d2 | 1.1.1 | 3 |
| Smith | d2 | 1.1.2 | 4 |

(56) References Cited

U.S. PATENT DOCUMENTS

| | | | |
|---|---|---|---|
| 2006/0080345 A1* | 4/2006 | Murthy et al. | 707/100 |
| 2006/0106746 A1 | 5/2006 | Stuhec | |
| 2006/0117033 A1 | 6/2006 | Apparao et al. | |
| 2006/0117250 A1 | 6/2006 | Rothschiller et al. | |
| 2006/0212420 A1* | 9/2006 | Murthy | 707/1 |
| 2007/0239681 A1* | 10/2007 | Krishnaprasad et al. | 707/3 |
| 2007/0260650 A1 | 11/2007 | Warner et al. | |
| 2007/0271218 A1* | 11/2007 | Lim et al. | 707/2 |
| 2007/0271243 A1 | 11/2007 | Fan et al. | |
| 2007/0271305 A1 | 11/2007 | Chandrasekar et al. | |
| 2008/0016122 A1 | 1/2008 | Liu et al. | |
| 2008/0082484 A1 | 4/2008 | Averbuch et al. | |
| 2008/0082560 A1 | 4/2008 | Agrawal et al. | |
| 2008/0091710 A1 | 4/2008 | Charlet et al. | |
| 2008/0098020 A1* | 4/2008 | Gupta et al. | 707/101 |
| 2008/0120608 A1 | 5/2008 | Shetty et al. | |
| 2008/0270380 A1 | 10/2008 | Ohrn et al. | |
| 2009/0240712 A1 | 9/2009 | Murthy | |

OTHER PUBLICATIONS

Dalamagas et al., "Clustering XML Documents Using Structural Summaries", Springer Berlin/ Heidelberg, vol. 3268/ 2005, 10 pages.

U.S. Appl. No. 12/052,510, filed Mar. 20, 2008, Office Action Mailed Aug. 9, 2011.

U.S. Appl. No. 12/052,510, filed Mar. 20, 2008, Final Office Action, mailed Feb. 7, 2012.

U.S. Appl. No. 12/052,510, filed Mar. 20, 2008, Final Office Action, mailed Mar. 17, 2011.

U.S. Appl. No. 12/052,510, filed Mar. 20, 2008, Advisory Action, mailed May 26, 2011.

U.S. Appl. No. 12/052,510, filed Mar. 20, 2008, Office Action, mailed Apr. 19, 2013.

* cited by examiner

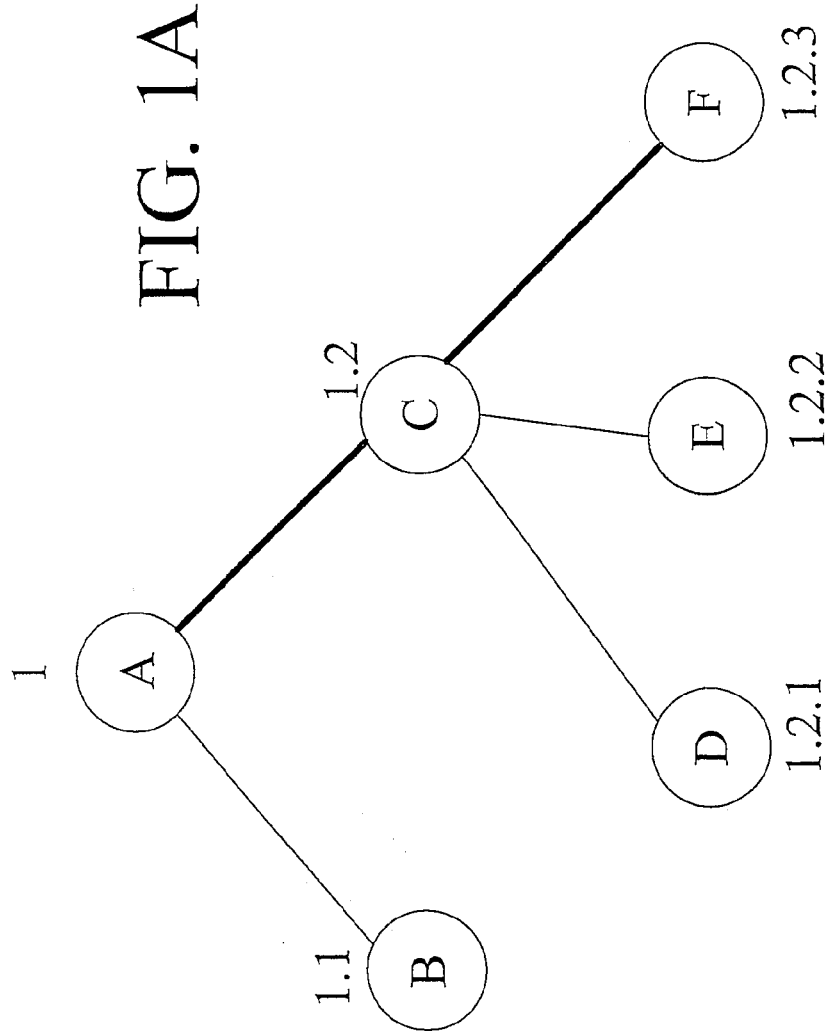

| PathId | Pathname |
|---|---|
| 1 | /resume |
| 2 | /resume/fullname |
| 3 | /resume/fullname/firstname |
| 4 | /resume/fullname/lastname |
| 5 | /resume/project |
| 6 | /resume/skill |

FIG. 3

| Key | Document id | Order key | Pathid |
|---|---|---|---|
| Scott | d1 | 1.1.1 | 3 |
| Brown | d1 | 1.1.2 | 4 |
| Java | d1 | 1.2 | 5 |
| Java | d1 | 1.3 | 6 |
| Java | d2 | 1.4 | 6 |
| C | d1 | 1.4 | 6 |
| C | d2 | 1.2 | 5 |
| C | d2 | 1.3 | 6 |
| David | d2 | 1.1.1 | 3 |
| Smith | d2 | 1.1.2 | 4 |

FIG. 4

MECHANISM FOR EFFICIENTLY SEARCHING XML DOCUMENT COLLECTIONS

RELATED CASES

The present application is related to U.S. application Ser. No. 10/884,311 filed on Jul. 2, 2004, which is incorporated herein by reference;

FIELD OF THE INVENTION

The techniques presented herein are directed towards providing a user-directed keyword-based search on a large collection of XML documents, and displaying a summary of results to the user.

BACKGROUND OF THE INVENTION

Large collections of XML (eXtensible Markup Language) documents are increasingly prevalent in the enterprise. Information about the structure of specific types of XML documents may be specified in documents referred to as "XML schemas". For example, the XML schema for a particular type of XML document may specify the names for the data items (tags) contained in that particular type of XML document, the hierarchical relationship between the data items contained in that type of XML document, data types of the data items contained in that particular type of XML document, etc.

XML elements are delimited by a start tag and a corresponding end tag. For example, in the following XML fragment, <Author> is a start tag and </Author> is an end tag to delimit an element.

```
<book>My book
      <publication publisher="Doubleday"
                date="January"></publication>
      <Author>Mark Berry</Author>
      <Author>Jane Murray</Author>
</book>
```

The data between the element start and end tags is referred to as the element's content. An element's content may include values and other elements. In the case of the Author element, the content of the element is the text data value Mark Berry. In the case of the Book element, the content includes the text data value My Book and the elements publication and two Author elements. A data value may comprise one or more text words. An individual word may be used as a searchable keyword. For example, "Berry" may be a keyword that is searched for independent from searching from keyword "Mark" even though they may be part of the same text data value. An element is herein referred to by its element name. For example, the element delimited by the start and end tags <publication> and </publication> is referred to as publication.

Node Tree Model

An important standard for XML is the XQuery 1.0 and XPath 2.0 Data Model. (see W3C Working Draft 9 Jul. 2004, which is incorporated herein by reference) One aspect of this model is that a XML document is represented by a hierarchy of nodes that reflects the hierarchical nature of the XML document. A hierarchy of nodes is composed of nodes at multiple levels. The nodes at each level are each linked to one or more nodes at a different level. Each node at a level below the top level is a child node of one or more of the parent nodes at the level above. Nodes at the same level are sibling nodes. In a tree hierarchy or node tree, each child node has only one parent node, but a parent node may have multiple child nodes. In a tree hierarchy, a node that has no parent node linked to it is the root node, and a node that has no child nodes linked to it is a leaf node. A tree hierarchy has a single root node.

In a node tree that represents a XML document, a node can correspond to an element. The child nodes of the node correspond to an attribute or another element contained in the element. The node may be associated with a name. For example, the name of the node representing the element book is book. For a node representing the attribute publisher, the name of the node is publisher.

For convenience of expression, elements and other parts of a XML document are referred to as nodes within a tree of nodes that represents the document. Thus, a node representing an element may be referred to by the element name, and a node value may be referred to as the element value. For example, referring to 'My book' as the value of the node with the name book is just a convenient way of expressing that the value of the element associated with node book is My book. The name of an element, attribute, or node is also referred to herein as a tag name.

The path for a node in a XML document is the series of nodes, starting from an ascendant node in a XML document to arrive at a particular node further down in the hierarchy. For example, the path from the root of XML document to node publication is represented by '/book/publication'.

Path Expressions

XML documents may be searched by using an XML query language such as XQuery/XPath. XML Query Language ("XQuery") and XML Path Language ("XPath") are important standards for a querying data in XML documents. The primary syntactic construct in XPath is an expression, which is evaluated to yield an object. XPath expressions are described in Section 3 ("Expressions") of "XML Path Language (XPath)" (version 1.0). A path is a location of a node within an XML document hierarchy; a path expression is a representation (a way of expressing or specifying) that location. Constructing a path expression may require that the user know the structure of the document. Thus, when the collection of XML documents does not have a schema that expresses their structure, or there is not one common schema to which all XML documents in the collection conform, it can be difficult using XQuery/XPath to formulate a query to find information in those documents.

Order Key

An order key is a compressed representation of a node's hierarchical position and ordering within an XML document. The order key may be represented using a Dewey-type value. The order key of a node may be created by appending a value to the order key of the node's immediate parent, where the appended value indicates the order, among the children of the parent node, of that particular child node. The following description refers to the hierarchy shown in FIG. 1A. The order of peer nodes (having the same parent) is read from left to right. The left-most node is position 1. In the example, node F is a child of a node C that is a child of a node A. F has the order key "1.2.3." The final "3" in the order key indicates that the node F is the third child of its parent node C. Similarly, the "2" indicates that node C is the second child of node A. The leading 1 indicates that node A is the root node (i.e. has no parent).

Approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is an example node hierarchy representing an XML document showing the order keys assigned to each node.

FIG. 3 shows an example of a path name index for the schema shown in FIG. 2.

FIG. 4 shows an example of an inverted index.

DETAILED DESCRIPTION OF THE INVENTION

Overview

Figure 1B:
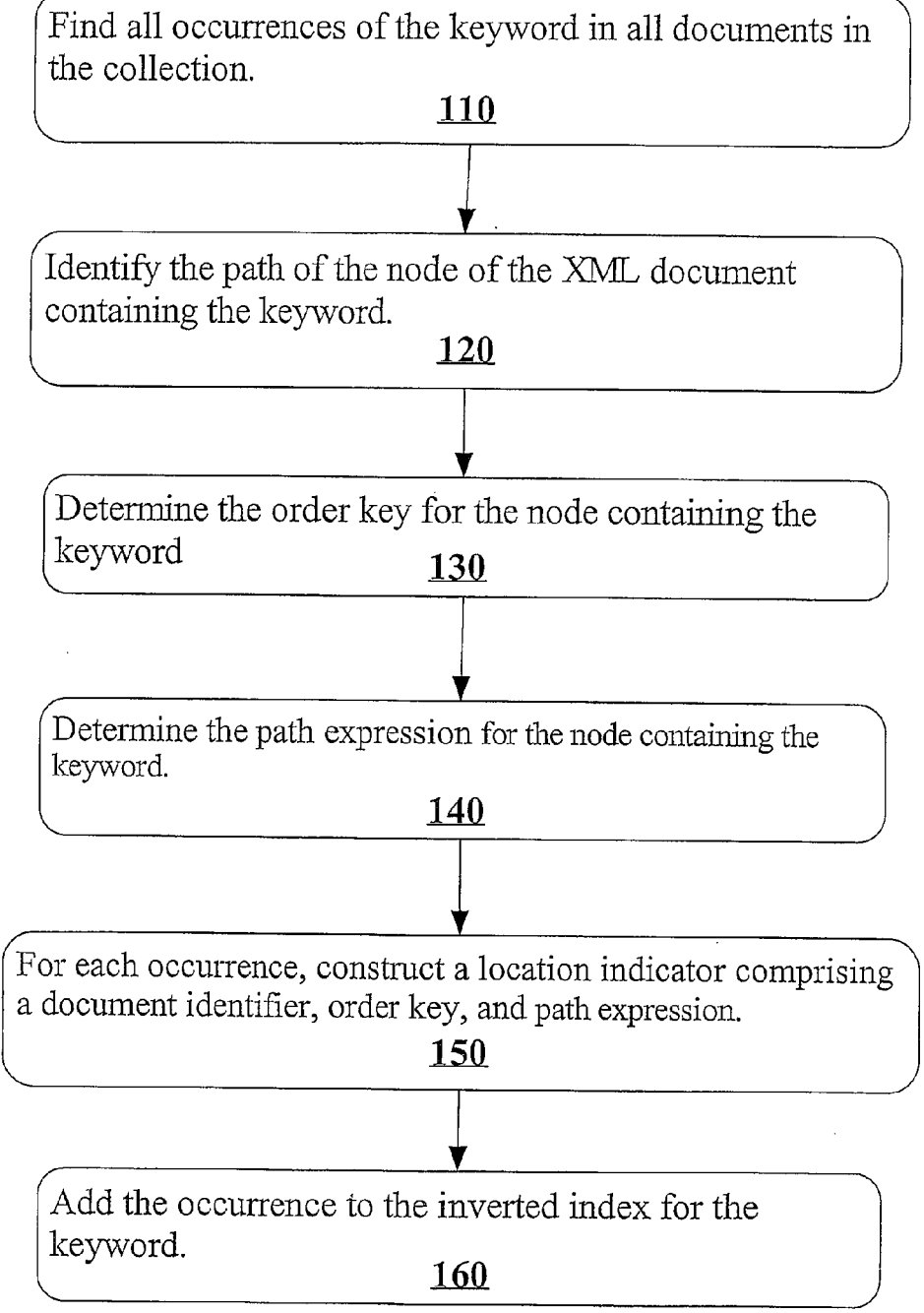
FIG. 1B shows a flow diagram of the steps for creating an inverted index.

Other approaches have been used for searching for one or more keywords in an arbitrary set of documents. The documents searched in these approaches tend not to share any particular structure, and the search approaches do not depend on or exploit any such structure even if structure exists as in XML documents. These approaches typically store a byte count offset(s) in the index that indicate where within the documents the desired keyword was found. If the byte count offset is shown to the user along with a document identifier as part of the search results, the offset provides no information about the (XML node or path) context of the document in which the keyword is found, and the user may have to open the document and look at the text at that byte offset to discover whether that instance of the keyword provided the information sought. Furthermore, the document identifiers are ranked in relevance order, and only a small number of top-ranked documents are displayed on the first screen. The user must advance to subsequent screens to see more document identifiers containing the matching keywords. It is not unusual for there to be many thousands of documents containing the keyword, and the user is unlikely to visit all of them. There is typically no way to summarize the results across all documents returned by the search.

Described herein is an approach for presenting more useful keyword search results to a user searching for information in a large collection of potentially large XML documents. There are several aspects to the approach. First, an inverted index of keywords is constructed. In general, an index provides a mapping between specific content, such as keywords, to a location where the content is found. The specific content looked up in the index is a key value. An index comprises a set of one or more index entries each of which contains one or more key values and one or more location references. In the approach described herein, the collection of XML documents is indexed. The index key is a keyword that a user might search for within the collection of XML documents, and the location reference comprises one or more sets of document identifier, path expression, and/or order key. Thus, the inverted index used in this approach contains XML structural information regarding the collection of XML documents. A user might find search results more meaningful if the results point to specific nodes within an XML document where the desired information resides.

A second aspect of the solution may be to use the new inverted index to find the specific portions of each document containing the keyword, and displaying that portion of the document in context to allow the user to determine whether that instance of the keyword is interesting without having to open the document and find the keyword within. This feature may be especially useful with very large documents. The location information found in the inverted index (specifically the order key) allows very efficient keyword lookup within each document. Having the structural information allows an expanded view of just the node containing the keyword and optionally displaying the surrounding nodes for additional context.

A third element of the solution may involve providing the user with summary information across a collection of documents. Rather than display the first ten of potentially thousands of results, a new display technique summarizes the entire set of search results, not just the highest ranked results. If a particular path shows up frequently across documents in the search results, the user might want to refine the search to constrain the search to one or more specific paths (also called "searching within path context"). A fourth aspect of the solution may allow the user to issue subsequent searches that narrow the portions of the document, yielding results that are easier to examine for relevancy.

Constructing the Inverted Index

FIG. 1 shows a flow diagram of the steps for creating an inverted index that contains XML structural location information for a keyword. Constructing the index may be an offline process. A set of keywords is selected for indexing by means outside the scope of this specification. The flow of FIG. 1 may be performed for each keyword to be stored in the index. In Step 110, all occurrences of the keyword are found in all documents in the collection of XML documents being indexed. Information about an occurrence includes the path in which the keyword is contained as a value in the node (Step 120).

Figure 2:
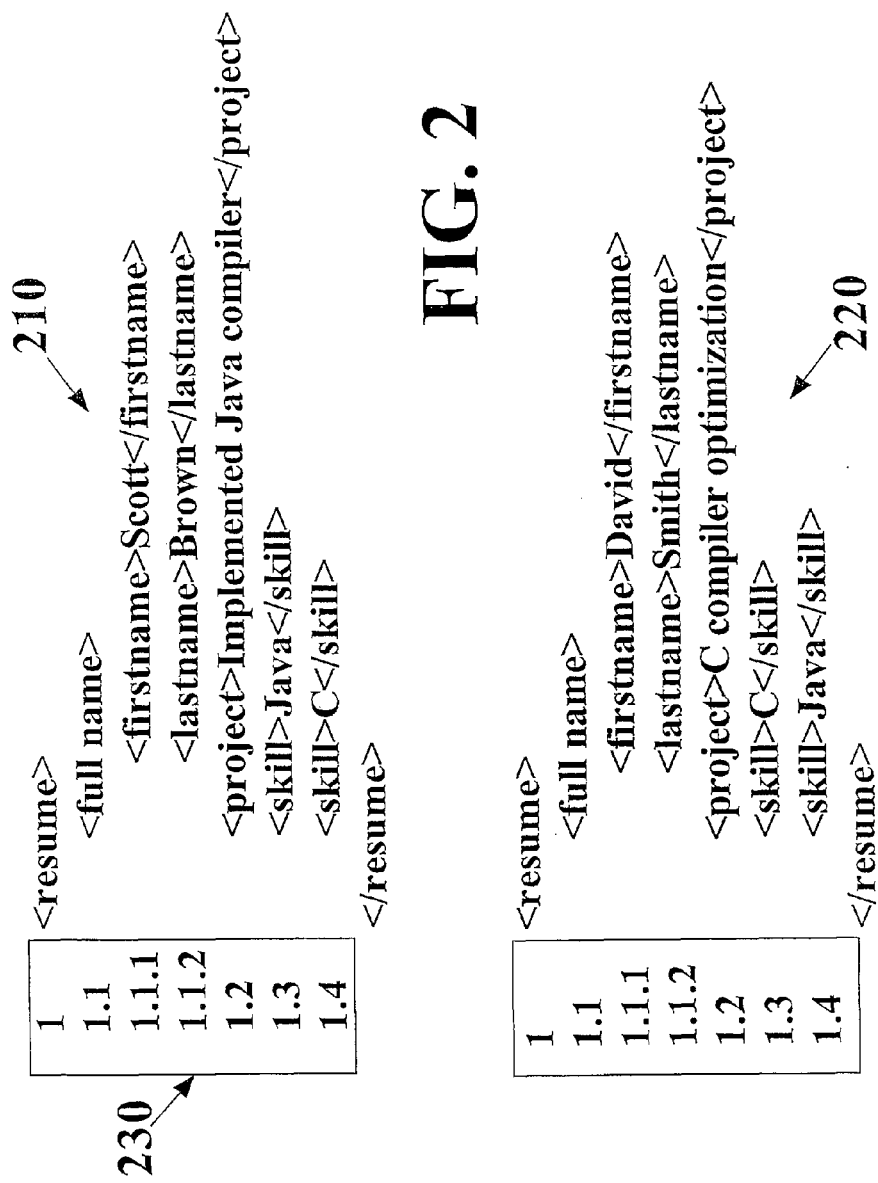
FIG. 2 shows an example of two XML documents conforming to the same schema.

In Step 130, the order key associated with the path identified in Step 120 is determined. In one embodiment, the order key is looked up in an index. The order key is a Dewey-based, hierarchical numbering system. Siblings in the hierarchy are numbered consecutively in order, and when descending a level in the hierarchy, the numbering starts over in a new decimal place. FIG. 2 shows an example of two XML documents, d1 (210), and d2 (220), having the same structure, and the order key (230) for its structure at the left.

The word "Java" is found in the nodes identified by order keys 1.2 and 1.3 in d1, and order key 1.4 in d2. 1.3 and 1.4 have the same path name, but skill is a repeated element in the documents. The correct instance of the node containing the keyword, in addition to the path name, is identified.

In Step 140, the path expression for the path is determined. In one embodiment, a path name is used to represent the path. In another embodiment, a path expression is a path id. A path id is a concise representation of a path name. In one embodiment, a path id is a key into an index of pathnames. FIG. 3 shows an example of a table of path names indexed by a path id that has been assigned a simple numeric representation. The path corresponding to order key 1.2 is "/resume/project," and the corresponding path id is 5. The path corresponding to order key 1.3 is "/resume/skill," and the corresponding path id is 6. The pathname for both order keys 1.3 and 1.4 is "/resume/ skill," and therefore, the corresponding path id for both order keys is 6. Thus, the path id's for "Java" in document d1 include both 5 and 6, but in document d2 the only path id is 6.

There are many ways to store the path id values. In one embodiment, delta compression is used to reduce the space required for numeric path identifiers. Delta compression is a technique that involves storing a base plus an offset which can be used to derive the numeric identifier, but which together occupy less space than the identifier itself. For example, instead of storing the list (1045, 1048, 1055), the list (1045, 3, 7) could be stored where the second and third entries indicate a delta of '3' and '7' relative to their previous values respectively. Delta compression can also be used to save space for order key storage.

In Step 150 a location indicator is constructed which, for each instance of the keyword, comprises identification of a document in which the keyword is found, the order key, and the path expression. In one alternative embodiment only the document identifier and the order key are stored without the path id. In Step 160, the location indicator is added to the inverted index for the keyword. There may be one location indicator in the index for each occurrence of the keyword found in the collection of searched XML documents.

FIG. 4 shows an example inverted index based on the examples shown in FIGS. 2 and 3. Each entry in the index shown contains only one location indicator, and multiple index entries may be required for each keyword. Alternatively, a single index entry may be created for each distinct keyword and multiple location indicators may be stored in a single index entry.

The index may be stored in any convenient data structure. For example, a balanced search tree data structure may be used. In one embodiment, the inverted index is stored as a self-balanced search tree, e.g., a B-tree. All of the data entries contained within in a B-tree data structure may be contained within the leaf nodes of the tree. The individual entries may include a single location indicator, or alternatively, each keyword can be used to find a single B-tree entry, where multiple location indicators are stored together as a blob contained in a single leaf node of the B-Tree.

Displaying Selected Portions of Search Results to the User

Once created, the index can be used to efficiently process keyword-based user search requests. The keywords specified by the user are looked up in the inverted index, and the set of location indicators are retrieved. In one embodiment, for each document in which the keyword is found, the contents of only the one or more nodes containing the keyword within the document are displayed. Alternatively, nodes surrounding the one or more nodes containing the keyword are displayed. In yet another alternative embodiment, only the top-level of the hierarchy is shown, with nodes containing the keyword highlighted for directed user-drilldown. The top level hierarchy displayed shows elements of potential user interest. The user may click on an element to view its contents.

When displaying portions of the documents in which the keywords are found, it will generally not be possible to show all documents in the search results on the screen simultaneously. Therefore, prioritization must be done among the search results to determine which documents to display first. Standard ways of document ranking may be used, and the documents may be displayed in rank order with the ability to request documents further down in the ranking by moving to the next screen display.

Presenting Search Results Summary Information

Another way of displaying search results can be used in addition to or instead of displaying selected portions of the documents in which the keywords reside. Whereas displaying selected portions of a document is document-centric and may be limited to the highest ranked documents that will fit on the screen, a summary of results shows a global view of where within the structure of a set of XML documents the desired information is found. By summarizing the location where keywords are found across all documents in the search results (not just the highest ranked), the user may better determine where to focus subsequent search efforts.

There are various choices about how to display the summary information to the user. In one embodiment, the path contexts in which the keyword is found is displayed along with their frequency counts. Path contexts may be displayed in rank order with the most frequently occurring paths shown at the top of the displayed list. However, because of the hierarchical nature of the data, there could be nested nodes that contain the keyword. For example, the following document structure has a name element appearing at two different levels of the hierarchy:

```
<customer record>
    <name>Preeti Ramanathan</name>
    <credit card>
        <name>Preeti Ramanathan</name>
        <street>3456 Oregon Pl.</street>
        <city>Philadelphia</city>
        <state>PA</state>
    </credit card>
</customer record>
``` name in the first level of the hierarchy represents the name of the customer and in the second level represents the name on the credit card associated with the account. Sometimes the data values for the names will be the same, and sometimes the credit card name on the account will be for a parent or spouse of the account holder. In this example, "Preeti" can be found at both "/customer/name" and at "/customer/credit card/name." In the case where there are 20 accounts owned by people with the first named Preeti, and half of these people also have a credit card in the name of the account holder, then the frequency list may appear as the following when a keyword search for "Preeti" is performed:

```
/customer/name (20)
/customer/credit card/name (10)
```

This display shows the number of names matching the search keyword directly contained within the node represented by the displayed path.

The desire to fit all summary information on a single display screen motivates an embodiment in which the level of granularity displayed considers both the number of paths to display and the screen real estate. In other words, the summary results may show as much fine grained detail as will allow for including all paths containing the keyword on a single display screen. When the list of paths to display grows too large, then summarizing peer paths at a higher parent path in the hierarchy may take place. In addition, knowledge about certain paths that are usually considered interesting to users may always be displayed in the search results even if their peer paths are collapsed into a higher level node. For example, if there are display results for /a/b/c, /a/b/d, and /a/b/e, it might be known that /a/b/e has a high probability of being interesting to users. As a result, the display may show /a/b that includes /a/b/c and /a/b/d, but /a/b/e would be displayed separately from /a/b. When collapsing paths into a common ancestor path, the keyword frequencies are added together. From the example above:

/customer (30)

shows the number of names matching the keyword within the entire /customer subtree, and not necessarily directly contained within the customer node. A hybrid approach can be used that allows a path to be expanded to see its constituent parts. For example, the user can see:

+/customer (30)

and when requesting expansion, the next display would show:

- /customer(0)
name (20)
credit card/name (10)

When a path context is expanded, the frequency count displayed next to it represents the number of keyword instances found within the value of the node itself (not within the value of its element children). In the example, the /customer node contains no data values, only elements, and therefore, no instances of the keyword are found within the data value of the /customer node itself.

Both the frequency of occurrences and the path context where key words are found can be helpful for the user to know how best to refine the search. The count of the number of documents containing the keyword in a particular location within the document gives users a sense of keyword density that directs user attention to the portion of documents most likely to contain the information sought. This is analogous to looking in a book index and choosing to look first at the pages whose page numbers are bolded or the pages with the greatest page range for that keyword in the index. Second, the pathnames displayed in conjunction with the occurrence counts can be descriptive of the context in which the keyword appears, providing clues as to whether that node is likely to provide the kind of information desired. The latter use of summary data is particularly helpful when the user does not know the structure of the data a priori.

Interactive Search Refinement

The user can view the summary data and determine how best to refine the search. For example, if the user looks at the summary information in the example given above and decides that they are more interested in credit card holder names than in account holder names, the search could be revised as:

"Preeti Ramanathan" IN "/customer/credit card/name"

to find all the instances containing Preeti Ramanathan as the name on a credit card associated with a customer account. The summary data may be presented in an interactive way, making it easy to refine the search by interacting with the display. Subsequent requests for searching can continue in this way.

Hardview Overview

Figure 5:
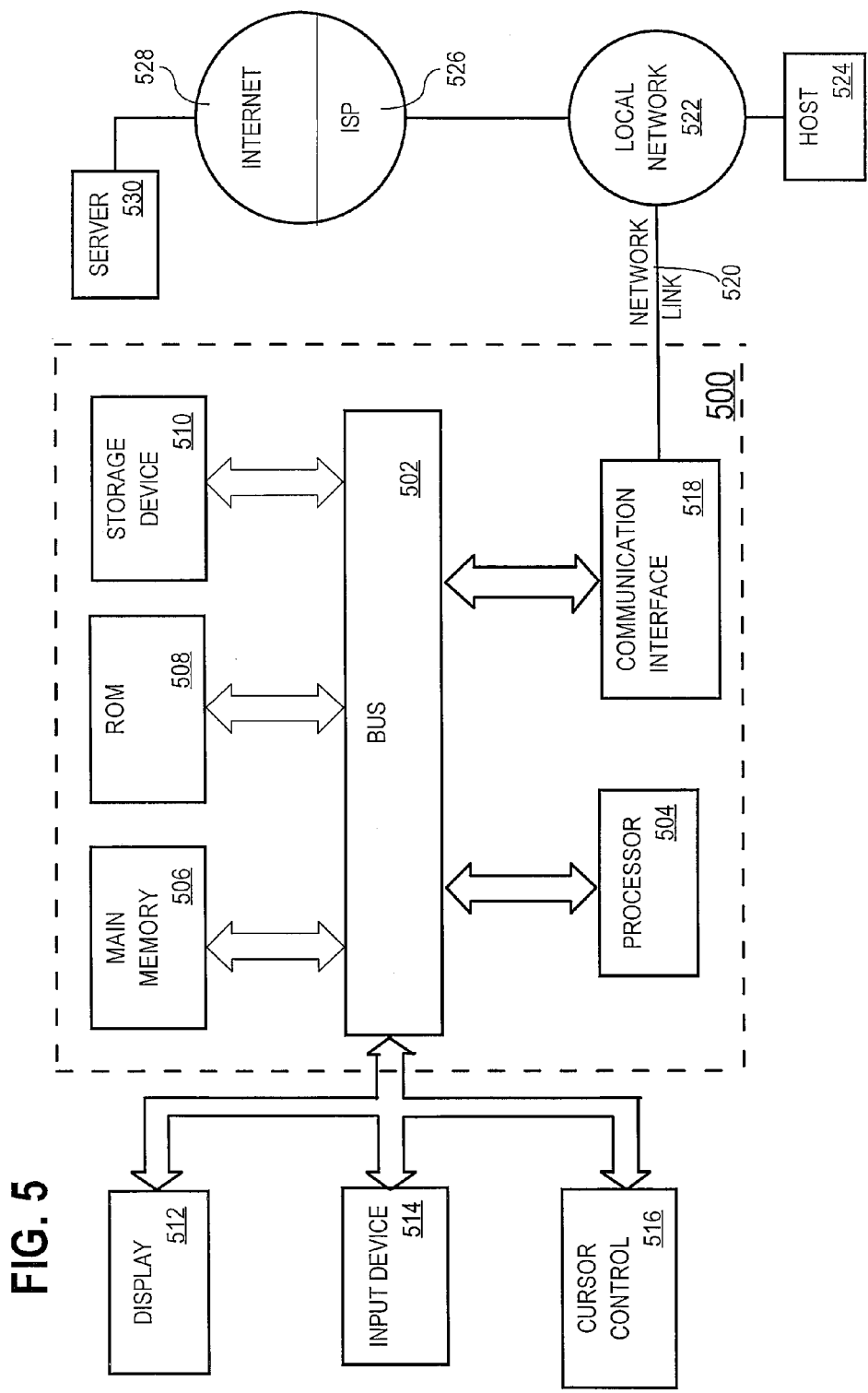
FIG. 5 is a block diagram of a computer system that may be used in an embodiment of the present invention.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 708 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for generating a response to a search request comprising:
   receiving a search request comprising one or more keywords;
   retrieving, from an index, a set of location indicators, wherein each location indicator of the set of location indicators is stored in association with at least one keyword of the one or more keywords;
   wherein a location indicator of the set of location indicators includes:
      a document identifier identifying a particular XML document in a collection of XML documents containing a particular keyword of the one or more keywords;
      an order key specifying a hierarchical position of a node within the particular XML document that contains the particular keyword; and
      a path representation representing a path of the node within the particular XML document that contains the particular keyword; and
   displaying one or more nodes of the particular XML document that contains the particular keyword, wherein the one or more nodes includes the node located at the hierarchical position specified by the order key.

2. The method of claim 1, wherein the index contains exactly one index entry for each unique keyword of a set of keywords indexed in a collection of XML documents;
   wherein each index entry of said index entries includes:
      a particular keyword of said set of keywords indexed in the collection of XML documents; and
      a set of location indicators.

3. The method of claim 1, wherein:
   the index is stored as a balanced search tree;
   the particular keyword is a key into the index; and
   all location indicators of the set of location indicators included in an index entry are stored together as a single element in the balanced search tree.

4. The method of claim 1, wherein each location indicator of the set of location indicators:
   includes both an order key and a path representation;
   wherein the path representation represents a path of a particular node; and
   the order key specifies the hierarchical position of the particular node within an XML document.

5. The method of claim 1, wherein the path representation comprises a numeric path identifier, wherein the numeric path identifier is a key into an index of path names.

6. The method of claim 1, wherein the index is stored using delta compression.

7. The method of claim 1, wherein the displaying step further includes:
   for each unique path representation found within the set of location indicators:
      counting a number of occurrences of said each unique path representation within the set of location indicators; and
      displaying (a) a path represented by said each unique path representation, and
      (b) the number of occurrences of said each unique path representation.

8. The method of claim 7, wherein said each unique path representation and said number of occurrences is displayed; and further comprising:
   in response to displaying, receiving a subsequent request to refine the search request, wherein the subsequent request specifies a set of path representations; and for each particular path representation in the set of path representations, finding a particular set of location indicators, wherein each location indicator in the particular set of location indicators includes said each particular path representation and an order key; and
displaying the order key.

9. The method of claim 7, wherein displaying:
(a) the path represented by said each unique path representation further comprises:
identifying a first prefix;
associating the first prefix with a set of path representations, wherein the set of path representations is a subset of all the unique path representations for the entire set of XML document and the each path representation in the set of path representations starts with the first prefix; and
displaying the first prefix; and
(b) the number of occurrences of said each unique path representation further comprises:
determining the sum of the number of occurrences for all of the path representations in the set of path representations; and
displaying said sum.

10. The method of claim 9, further comprising the steps of:
identifying a very popular path representation, wherein the very popular path representation starts with said first prefix;
not adding the very popular path to the set of path representations associated with the first prefix; and
displaying the very popular path and the number of occurrences for the very popular path separately from displaying the set of path representations.

11. The method of claim 1, wherein the one or more nodes further includes one or more nodes surrounding the node located at the hierarchical position specified by the order key.

12. A non-transitory computer-readable storage medium storing one or more sequences of instructions, which when executed, cause one or more processors to perform steps comprising:
receiving a search request comprising one or more keywords;
retrieving, from an index, a set of location indicators, wherein each location indicator of the set of location indicators is stored in association with at least one keyword of the one or more keywords;
wherein a location indicator of the set of location indicators includes:
a document identifier identifying a particular XML document in a collection of XML documents containing a particular keyword of the one or more keywords;
an order key specifying the hierarchical position of a node within the particular XML document that contains the particular keyword; and
a path representation representing a path of the node within the particular XML document that contains the particular keyword; and
displaying one or more nodes of the particular XML document that contains the particular keyword, wherein the one or more nodes includes the node located at the hierarchical position specified by the order key.

13. The non-transitory computer-readable storage medium of claim 12, wherein the index contains exactly one index entry for each unique keyword of a set of keywords indexed in a collection of XML documents;
wherein each index entry of said index entries includes:
a particular keyword of said set of keywords indexed in the collection of XML documents; and
a set of location indicators.

14. The non-transitory computer-readable storage medium of claim 12, wherein:
the index is stored as a balanced search tree;
the particular keyword is a key into the index; and
all location indicators of the set of location indicators included in an index entry are stored together as a single element in the balanced search tree.

15. The non-transitory computer-readable storage medium of claim 12, wherein each location indicator of the set of location indicators:
includes both an order key and a path representation;
wherein the path representation represents a path of a particular node; and
the order key specifies the hierarchical position of the particular node within an XML document.

16. The non-transitory computer-readable storage medium of claim 12, wherein the path representation comprises a numeric path identifier, wherein the numeric path identifier is a key into an index of path names.

17. The non-transitory computer-readable storage medium of claim 12, wherein the index is stored using delta compression.

18. The non-transitory computer-readable storage medium of claim 12, further comprising instructions for displaying, said instructions which when executed, cause the one or more processors to perform steps comprising:
for each unique path representation found within the set of location indicators:
counting a number of occurrences of said each unique path representation within the set of location indicators; and
displaying (a) a path represented by said each unique path representation, and
(b) the number of occurrences of said each unique path representation.

19. The non-transitory computer-readable storage medium of claim 18, wherein said each unique path representation and said number of occurrences is displayed; and further comprising instructions, which when executed, cause the one or more processors to perform steps comprising:
in response to displaying, receiving a subsequent request to refine the search request, wherein the subsequent request specifies a set of path representations; and
for each particular path representation in the set of path representations, finding a particular set of location indicators, wherein each location indicator in the particular set of location indicators includes said each particular path representation and an order key; and
displaying the order key.

20. The non-transitory computer-readable storage medium of claim 18, further comprising instructions, which when executed, cause the one or more processors to perform steps comprising:
(a) display the path represented by said each unique path representation comprising:
identifying a first prefix;
associating the first prefix with a set of path representations, wherein the set of path representations is a subset of all the unique path representations for the entire set of XML document and the each path representation in the set of path representations starts with the first prefix; and
displaying the first prefix; and (b) display the number of occurrences of said each unique path representation comprising:
determining the sum of the number of occurrences for all of the path representations in the set of path representations; and
displaying said sum.

21. The non-transitory computer-readable storage medium of claim 20, further comprising instructions, which when executed, cause the one or more processors to perform steps comprising:
identifying a very popular path representation, wherein the very popular path representation starts with said first prefix;
not adding the very popular path to the set of path representations associated with the first prefix; and
displaying the very popular path and the number of occurrences for the very popular path separately from displaying the set of path representations.

22. The non-transitory computer-readable storage medium of claim 12, wherein the one or more nodes further includes one or more surrounding the node located at the hierarchical position specified by the order key.

* * * * *

UNITED STATES PATENT AND TRADEMARK OFFICE
CERTIFICATE OF CORRECTION

PATENT NO.       : 8,650,182 B2
APPLICATION NO.  : 12/391818
DATED            : February 11, 2014
INVENTOR(S)      : Murthy Page 1 of 1

It is certified that error appears in the above-identified patent and that said Letters Patent is hereby corrected as shown below:

In the Claims

In column 11, line 53, in Claim 12, delete "the" and insert -- a --, therefor.

Signed and Sealed this
Eighth Day of July, 2014

Michelle K. Lee
*Deputy Director of the United States Patent and Trademark Office*